United States Patent

[11] 3,620,242

| [72] | Inventor | Morris G. Pease<br>Wadsworth, Ohio |
|---|---|---|
| [21] | Appl. No. | 517 |
| [22] | Filed | Jan. 5, 1970 |
| [45] | Patented | Nov. 16, 1971 |
| [73] | Assignee | The Babcock & Wilcox Company<br>New York, N.Y. |

[54] SELF-CLEANING DAMPER ASSEMBLY
7 Claims, 4 Drawing Figs.

[52] U.S. Cl. .............................................. 137/240,
251/306
[51] Int. Cl. ........................................... F16k 1/22
[50] Field of Search ........................... 251/305–308;
137/238, 240

[56] References Cited
UNITED STATES PATENTS

| 870,487 | 11/1907 | Bertram | 137/240 |
| 2,705,016 | 3/1955 | Saar | 137/240 X |
| 2,846,999 | 8/1958 | Loewenheim | 251/306 X |
| 3,498,584 | 3/1970 | Bowers | 251/305 |

Primary Examiner—M Cary Nelson
Assistant Examiner—Richard Gerard
Attorney—J. Maguire ABSTRACT: A damper assembly within a duct and a generally upright frame member having an interior damper seating surface, a shaft horizontally mounted and pivoted on the frame member with a blade member, including upper and lower body sections attached thereto. A gas jet adjacent the edge of the lower body section of the blade member affords means for removing particulate matter which tends to settle on the seating surface. A gas inlet and associated gas passageway are in flow communication with the gas jet, the gas inlet supplying a purge fluid to the gas jet. Means are also provided for rotating the blade member between first and second positions to open and close the damper.

PATENTED NOV 16 1971
3,620,242
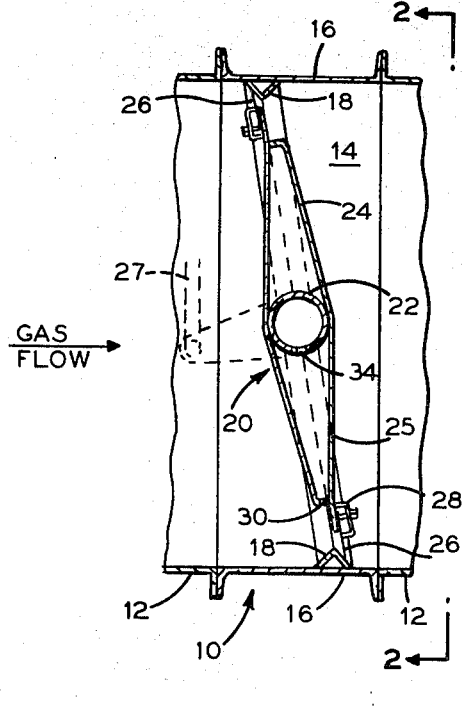
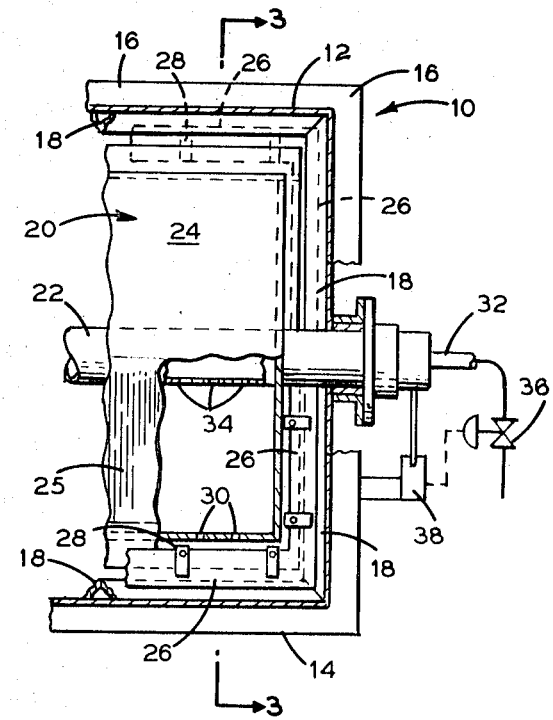
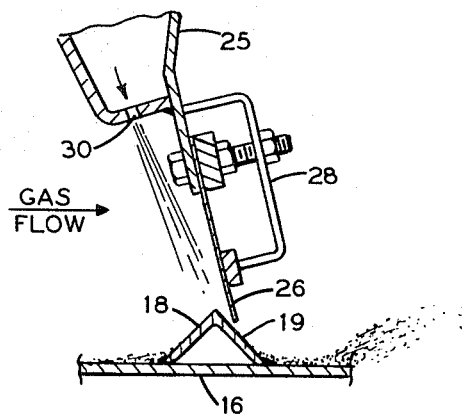
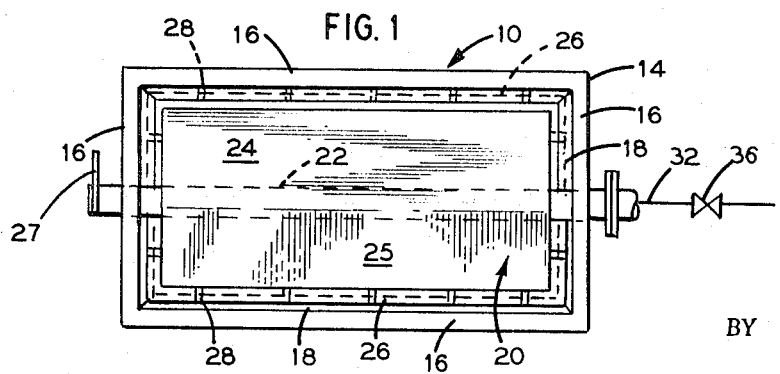
INVENTOR.
Morris G. Pease
BY
*J. Maguire*
ATTORNEY

3,620,242

SELF-CLEANING DAMPER ASSEMBLY

BACKGROUND AND SUMMARY OF THE INVENTION

The invention relates generally to dampers and the like for regulating the flow in a duct and especially to a gastight damper assembly installed therein and having a gas purge for improving the operational effectiveness thereof.

Industrial plants often employ ducts for conducting various gaseous fluids containing particulate matter, with a damper assembly being used to control flow through the ducts. It is frequently desirable to close the duct for such purposes as to isolate equipment during repair. In operation, however, the damper may not make a tight seal against the frame because particulate matter often builds up on the seating surface of the frame with the result that the damper is of limited effectiveness. Furthermore, the buildup of particulate matter may cause the damper to stick or bind in the closed position, thereby presenting special problems when it is desired to open the damper and resume flow through the duct. These difficulties are especially prevalent in horizontal ducts.

The dependability and effectiveness of flow dampers in horizontal ducts are improved by overcoming the aforesaid difficulties of binding and ineffective sealing, according to the present invention, by providing gas purge for removing particulate matter from the seating surface. According to the present invention, the damper assembly comprises, a generally upright frame member defining an opening and having a seating surface, a blade member including upper and lower body sections, mounted horizontally and pivoted on the frame member, the blade member having a gas jet adjacent the lower edge of the lower body section of the blade member for blowing a portion of the seating surface free of particulate matter, a gas inlet and a gas passageway, the gas passageway being in flow communication with the gas jet and the gas inlet to supply a gaseous purge fluid to the gas jet; and means for rotating the blade member between first and second positions to open and close said opening respectively.

BRIEF DESCRIPTION OF THE DRAWINGS

In the drawings:

FIG. 1 is an elevational view of a damper assembly constructed and arranged in accordance with this invention;

FIG. 2 is an enlarged detailed view of the right-hand portion of the apparatus shown in FIG. 1;

FIG. 3 is a transverse sectional view taken along line 3—3 of FIG. 2; and

FIG. 4 is an enlarged view of a fragment of the apparatus of FIG. 3.

DESCRIPTION OF THE PREFERRED EMBODIMENTS OF THE INVENTION

The invention, as best seen in FIG. 3 is directed to a damper assembly 10 applied to a generally horizontal duct 12 carrying gases containing particulate matter. It is the purpose of the damper assembly 10 to control the flow of gas through the duct 12.

The damper assembly 10 includes a damper frame 14 defining an opening and which may be made of structural steel channels 16. The channels 16 form rectangular frame 14 within which a stop 18 is provided to form a damper seating surface 19 disposed generally transverse to the direction of gas flow through the duct 12. Positioned within the frame 14 is a damper blade 20 mounted on shaft 22, the latter being pivotally connected to opposite channels 16 of the frame 14 so that the blade 20 is movable between open and closed position relative to the frame 14.

The damper blade 20 comprises upper and lower body sections 24 and 25 respectively and may include a flexible edge portion 26, preferably made from a thin sheet of stainless steel or other durable material and suitably secured, as by clamps 28, to the body sections 24 and 25 and positioned to seat against the stop 18 of the frame 14 in sealing relationship.

Flow through the duct 12 is controlled by the extent to which the damper blade 20 is open. In the closed position there will be no flow through duct 12. For purposes of this disclosure, the force for positioning the damper may be applied manually to shaft 22 through a positioning lever 27, but the concept is not so limited as it is well known that various hydraulic, electrical and pneumatic powered devices can be employed for this purpose.

According to the invention a gaseous fluid purge system is provided to remove accumulated particulate matter from the seating surface 19 of the stop 18 during closing of the damper, this is desirable in order to effect a tight seal between the flexible edge portion 26 of damper blade 20 and the seating surface 19, and also to facilitate subsequent opening of the damper blade 20. The particulate matter is removed by pressurized gaseous fluid, e.g., air or steam, discharged through gas jets 30, which are here illustrated as orifices, to blow the seating surface clean. The gas jets 30 are shown as being located only on the lower body section 25, since generally there is little if any accumulation of particulate matter on the upper or side portions of the seating surface. The blade 20 is preferably mounted, as shown, so that the location of the lower body section 25 in the open position is downstream of its location in the closed position. This substantially reduces the possibility of particulate matter plugging the gas jets 30 as the jets are never directly facing the gas flow. Furthermore, the jets 30 are preferably located upstream of the flexible edge portion, since this location has been found to provide the best cleaning action.

The stop 18 is illustrated as a standard structural angle shape since it has a readily cleanable seating surface.

The gaseous purge fluid is supplied to the gas jets 30 from a conventional, external source through an inlet connection 32 via a gas passageway in flow communication with the gas jets 30 and the inlet connector 32. As here illustrated the inlet connector 32 is located on shaft 22 and the passageway is defined by the hollow shaft 22 and the hollow lower body section 25. The gaseous purge fluid introduced into the hollow shaft 22 passes into the lower body section 25 through apertures 34 in shaft 22 and is then discharged through the jets 30 toward the damper seating surface 19.

Fluid flow to the gas jets 30 is regulated by valve 36, which is actuated by a limit switch 38, the limit switch being responsive to the position of the damper blade 20. In the illustrated embodiment, blowing is generally only effective to clean the seating surface during the time the blade is within the 20° arc immediately before closing, therefore it is desirable to adjust the limit switch 38 to open valve 36 during this 20° arc and to close the valve when the damper blade is wider open or in a fully closed position.

What is claimed is:

1. A gas tight damper assembly comprising:
   a. a generally upright frame member defining an opening and having a seating surface;
   b. a blade member, including upper and lower body sections, horizontally pivotally mounted on the frame member, the blade member having a sealing surface about its periphery for contacting the seating surface, a gas jet adjacent the sealing surface on the lower edge of the lower body section of the blade member and upstream thereof for blowing a portion of the seating surface free of particulate matter, a gas inlet, and a gas passageway in flow communication with the gas jet and the gas inlet to supply a gaseous purge fluid to the gas jet;
   c. means for rotating the blade member between first and second positions to open and close said openings respectively.

2. The apparatus according to claim 1, wherein the lower body section in the first position is downstream of the lower body section in the second position.

3. The apparatus according to claim 1, the sealing surface being a flexible edge portion mounted about the periphery of the blade member, the edge portion mounted on the lower body section being downstream of the gas jet.

4. The apparatus according to claim 1, further including a means responsive to the position of the blade for regulating the flow of gaseous purge fluid to the gas jet.

5. The apparatus according to claim 1, wherein the seating surface is an angular projection.

6. The apparatus according to claim 1, wherein the lower body section is hollow, and where the damper blade includes a hollow shaft having the gas inlet mounted thereon and having an apparatus to permit passage of a gaseous purge fluid between the shaft and the lower blade section.

7. The apparatus according to claim 1, wherein the frame member defines a rectangular opening.

* * * * *